United States Patent [19]

Belew et al.

[11] 4,377,266

[45] Mar. 22, 1983

[54] ELECTRICAL ROTARY JOINT APPARATUS FOR LARGE SPACE STRUCTURES

[75] Inventors: Robert R. Belew; Richard J. Boehme, both of Huntsville, Ala.

[73] Assignee: The United States of America as represented by the Administrator of the National Aeronautics and Space Administration, Washington, D.C.

[21] Appl. No.: 231,543

[22] Filed: Feb. 4, 1981

[51] Int. Cl.³ ............................................. B64G 1/44
[52] U.S. Cl. ................................. 244/159; 322/2 R; 339/5 R; 339/3 R; 343/DIG. 2; 244/173
[58] Field of Search ...................... 244/158, 159, 173; 339/6 R, 10, 8 A, 8 R, 5 R, 5 M, 3 R; 310/231, 232; 52/80; 322/2 R; 325/185; 343/766, DIG. 2; 136/292; 104/38, 35; 272/34

[56] References Cited

U.S. PATENT DOCUMENTS

| | | | |
|---|---|---|---|
| 2,761,569 | 9/1956 | Iserman | 339/5 M |
| 3,095,252 | 6/1963 | Adkins | 310/231 |
| 3,455,549 | 7/1969 | Forbush | 272/34 |
| 3,604,011 | 9/1971 | Hall | 343/766 |
| 3,713,164 | 1/1973 | Foury | 343/766 |

OTHER PUBLICATIONS

Denman et al. "A Microwave Power Transmission Sys. for Space Sat. Power", SAE/P-78/75, pp. 162-168, 1978.

Tonelli, "Design and Evaluation of a 5 GW GaAlAs Solar Power Sat.", SAE/P-78/75, pp. 156-161, 1978.

Primary Examiner—Galen L. Barefoot
Attorney, Agent, or Firm—Joseph H. Beumer; John P. Manning; Leon D. Wofford, Jr.

[57] ABSTRACT

A structural array and electrical rotary joint for transmitting an electrical power between large space structures having relative rotational movement therebetween is disclosed as including large support framework structures A and B which rotate relative to one another about a common axis of rotation X. A rotary interface joint 14 is defined between the structures A and B. A cylindrical hub member C is carried by the structure A and a cylindrical hub member is carried by support structure B with hub member C being received concentrically within hub member D for relative rotation. Tension connecting cables connect hub member C and hub member D with their associated outer structures A and B whereby relative rotational movement between structures A and B is transmitted to the cylindrical hub members for unitary motion therewith. Electrical conductor brush members 18 are carried by the hub D and electrical contact rings 16 are carried by the hub member C in sliding electrical contact with the brushes for transmission of electrical power during relative rotational movement between the support structures A and B.

7 Claims, 9 Drawing Figures

ELECTRICAL ROTARY JOINT APPARATUS FOR LARGE SPACE STRUCTURES

ORIGIN OF THE INVENTION

The invention described herein was made by employees of the U.S. Government and may be manufactured and used by or for the Government for governmental purposes without the payment of any royalties thereon or therefor.

BACKGROUND OF THE INVENTION

The invention relates to very large space structures having rotary joints and the requirement for a means to transfer electrical power across the rotary joint such as in transferring electrical power produced by a solar cell structure to a microwave antenna and support structure where the solar cell and microwave antenna support structures have a common axis of rotation.

This type of mechanical/electrical rotary joint design is applicable to space stations, large power satellites, construction bases, and systems utilizing nuclear reactors or solar thermodynamic power sources such as a photovoltaic space power satellite. The invention is particularly applicable to systems with power ratings of between 100 and 10 million kilowatts and the advantages increase with the size and power rating of the system.

The known prior art of rotary joints with power transfer assemblies used in space systems has been limited to small sizes able to support structures weighing a few hundred kilograms and to power ratings of a few kilowatts at about 100 volts. Conventional technology applicable to motor gear drives, small rotational shafts and bearings, and slip rings and brushes has satisfied previous applications. Typical electrical rotary joint apparatus for transferring electrical power is shown in U.S. Pat. No. 3,095,252.

Although improved materials and components have been developed and used, the configuration and overall design approach to such structures has been basically conventional. Considering the size and mass of such structures, the configuration and designs heretofore used have been rather complex and inefficient.

The state of the art for very large rotary joints with power transfer consists of enlarged and extended conventional rotary drive assemblies which include mounting huge slip ring and brush assemblies (over 1 kilometer in diameter) around the outer periphery of the rotary joint structure. In general, these have been very large, massive and rather impractical and operationally and economically infeasible.

A large diameter slip ring as required for a large satellite power system would require a large amount of expensive and scarce slip ring cladding such as silver. The cost of high performance materials for this application is too excessive. The huge circumference of the rotary assembly would incur very high distribution losses and heat rejection requirements. In addition, the brush speed and wear would be much higher than necessary. The large diameter concepts further require complex bearings of unprecedented size and alignment requirements, and the high frictional torque caused by such bearings and brushes are conducive to distortion, especially when large thermal variations are superimposed. The high frictional torques and the distortions incurred impose stringent requirements on the control and stability subsystems. Furthermore, the large conventional slip ring assemblies require orbital assembly and checkout.

The large diameter slip ring assemblies preclude the use of multiple slip rings and brush assemblies needed to subdivide the distribution system into smaller, unrelated and controllable buses within the capacity limits of switch gears. Without such provision, fault protection is inadequate, and the reliability and life of the system is seriously impaired.

SUMMARY OF THE INVENTION

Accordingly, it is the object of the present invention to provide electrical transmission rotary joint apparatus for use with large structures which rotate relative to one another wherein the size of the electrical rotary joint is comparatively reduced.

Another important object of the present invention is to provide electrical rotary joint apparatus for transmitting electrical power between a large space structure rotating relative to another large space structure or an appendage while maintaining a high degree of dimensional stability under varying load and temperature conditions.

Another important object of the present invention is to provide a comparatively small electrical transmission rotating joint capable of transmitting high power in an economic manner across the rotary interface of large associated supportive framework structures.

Yet another important object of the present invention is to provide electrical rotary joint apparatus which may be assembled and checked out on earth eliminating orbital assembly and check out which requires longer time, higher costs and increases the exposure of construction personnel to space radiation.

The above objects are accomplished according to the present invention in transmitting electrical power between large support framework structures which rotate relative to one another about a common axis and have a rotary interface joint by providing cylindrical hub members carried centrally within the interior of the structures. The cylindrical hub members are carried in a concentric relation with respect to one another and rotate coaxially. A first electrical conductor is carried by one cylindrical hub member and a second electrical conductor is carried by the other concentric hub member. The cylindrical hub members are structurally connected to their associated structures by tensioned cable pairs extending radially outward from the hubs to structural node points on the periphery of the framework of the structures at their rotary interface. Each hub is thus connected in a generally rigid unitary manner with its associated framework whereby the relative rotational movement of the support structures is transmitted to the cylindrical hub members without distortion and with dimensional stability. The first and second conductors are carried for relative sliding contact between one another for transmitting electrical power during relative rotational movement of the large structures.

A bearing support assembly is rotatably connected between the cylindrical hub members for accommodating radial and axial loads imparted on and between the cylindrical hub members. A rotary drive is connected between framework of the first and second large structures at the rotary interface joint for rotating one of the structures relative to the other to produce the relative rotational movement.

DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The invention is directed to very large frame space structures and the like having rotary interface joints and the need for transfer of electrical power across the interface joint.

Figure 1:
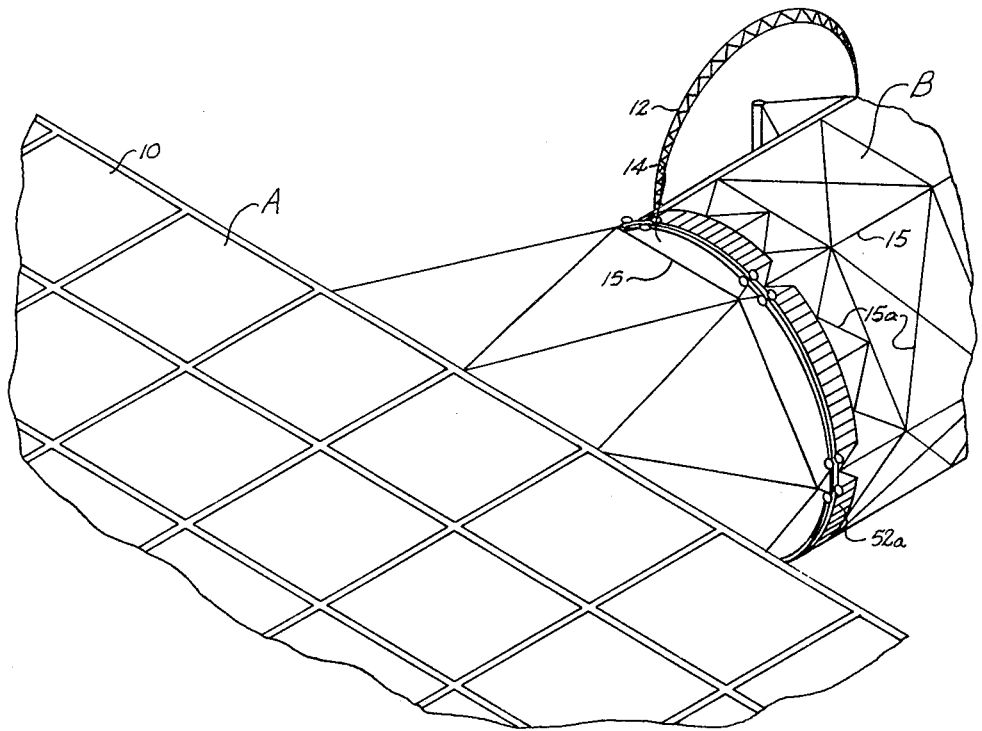
FIG. 1 is a perspective view illustrating a solar panel and power structure and a microwave antenna and support structure which rotate relative to one another about a common axis and incorporate an electrical rotary joint apparatus constructed according to the present invention.
Figure 2:
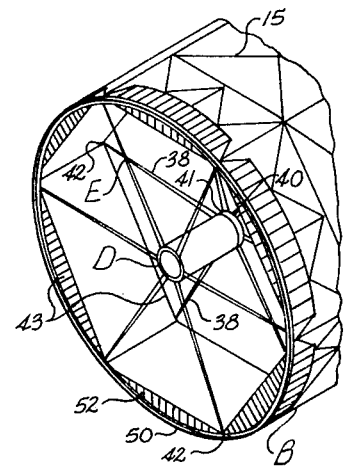
FIG. 2 is a perspective view of the rotary interface joint structure of the antenna support structure of FIG. 1.
Figure 3:
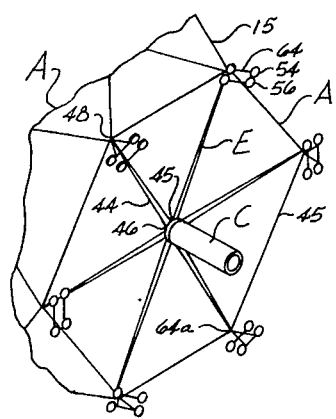
FIG. 3 is a perspective view of the rotary interface joint structure of the solar panel structure incorporating electrical rotary joint apparatus according to the invention.

As an example of such structures, illustrated in FIG. 1 is a framework structure A which supports a plurality of solar panels 10 which supply power to a microwave antenna 12 (not to scale) carried by a second support structure B. Between the two structures is a rotary interface joint 14 between which relative rotation between the first and second structures, A and B, takes place about a common axis X. Each structure, A and B, includes suitable framework structure which may include conventional supportive truss frames 15 as needed for structural integrity. Such are arranged in hexagonal and cylindrical cross-section which define an interior space. The framework of the rotary interfaces are preferably hexagonal in cross-section as will become hereinafter described.

Figure 4:
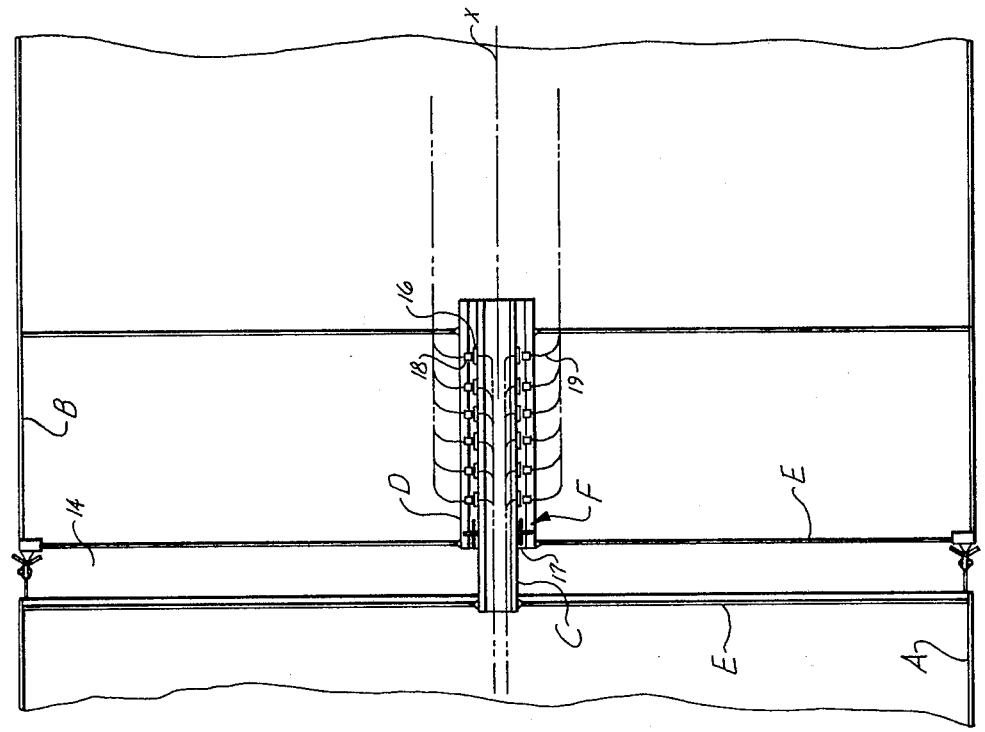
FIG. 4 is a schematic illustration of a rotary interface and electrical rotary joint structure according to the invention.
Figure 9:
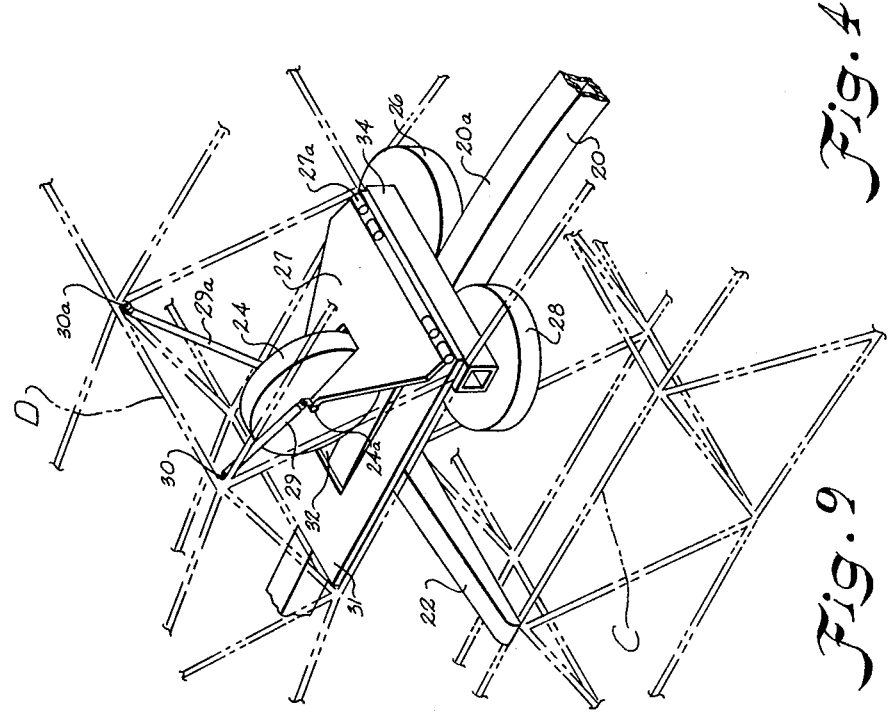
FIG. 9 is a partial perspective view illustrating support structure for the bearing assembly of FIGS. 7 and 8 according to the invention.
Figure 5:
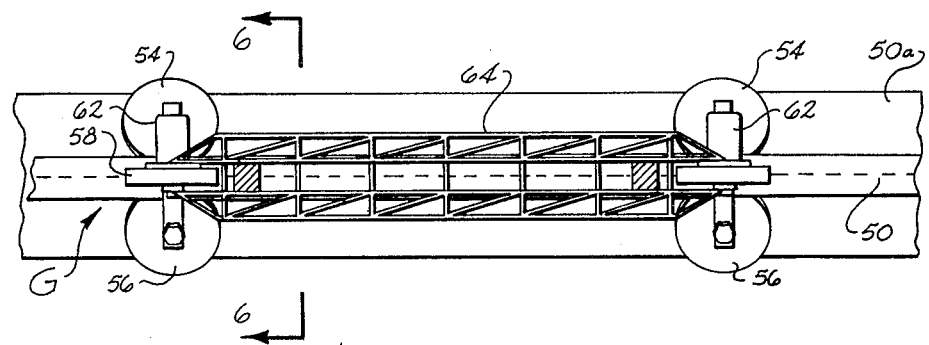
FIG. 5 is a elevation view illustrating rotary drive apparatus for rotating the rotary interfaces of FIGS. 2 and 3 according to the present invention relative to one another.
Figure 6:
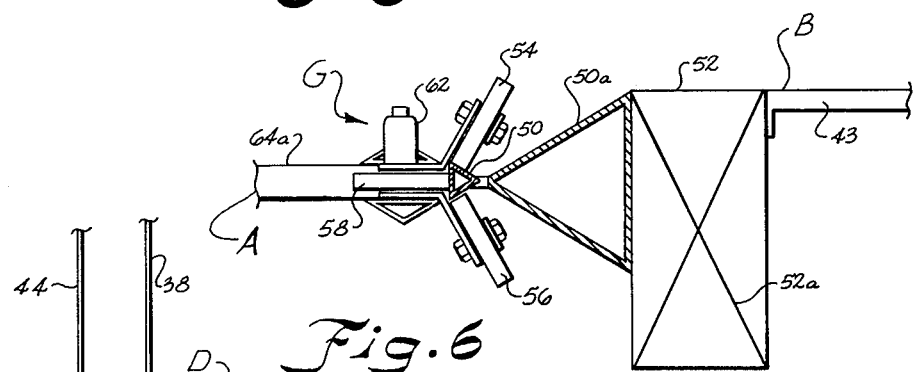
FIG. 6 is a sectional view taken along line 6—6 of FIG. 5.
Figure 7:
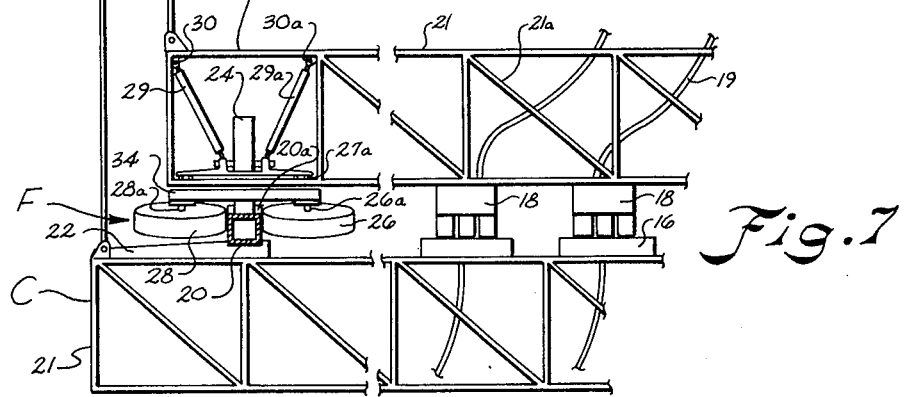
FIG. 7 is a partial elevational view illustrating a bearing assembly for connecting electrical rotary joint apparatus according to the invention.
Figure 8:
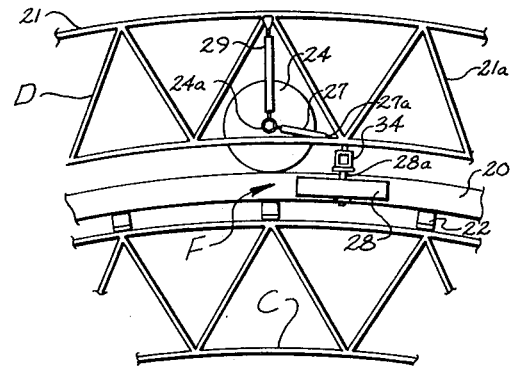
FIG. 8 is a front elevation view illustrating a bearing assembly connecting rotary joint apparatus according to the invention.

A first cylindrical hub member C is carried centrally of the structure A, and a second cylindrical hub member D is carried centrally of the structure B. Connecting means E connects the respective hub members C and D at structural node points on their respective associated structures A and B. The connecting means connects the hub members and structures in a generally rigid unitary manner whereby relative rotational movement of the structures A and B is transmitted to the cylindrical hub members C and D, respectively causing same to move as a unit. The cylindrical hub members C and D are carried in a concentric relation with respect to one another with hub member C being received within the cylindrical hub member D for relative rotation about the axis X. A first electrical conductor means 16 is carried by hub member C, and a second conductor means 18 is carried by hub member D as illustrated in FIG. 4. The first and second conductor means 16 and 18 are carried in relative sliding contact with one another for transmission of electrical power therebetween and across joint 17 during relative rotational movement of the cylindrical hub members and their associated structures. Conductor 16 may be fashioned as conventional slip ring structure and conductor 18 as brush structure. Conventional electrical lead lines 19 connect the respective contact conductors with the associated solar cell and antenna structure.

Hub members C and D are constructed of suitable framework which includes truss and diagonal 21 and 21a, which may be welded, as required for structural integrity.

A bearing support assembly designated generally at F is rotatably connected between the first and second cylindrical members C and D for accommodating radial and axial loads exerted on or between the cylindrical hubs by rotation of support structures A and B. Rotary drive means designated generally at G is provided and connected between the interfacing framework of the first and second structures A and B for rotating one of the structures relative to the other to produce the relative rotational motion. Bearing assemblies F maintain connection between structures A and B during rotation and accommodate the resulting reactive forces as transmitted through hub members C and D.

The bearing assembly F includes a roller track 20 which is suitably attached such as by welding to a track support fitting 22 carried on first cylindrical hub member C. Track 20 circumscribes the hub member C. A radial thrust roller 24 is carried by the second cylindrical hub member D and bears against the outer surface 20a of the roller track. A pair of axial thrust rollers 26 and 28 are carried by hub member D and engage the sides of the roller track 20 to accommodate axial loads between the concentric cylindrical hubs. The radial thrust roller 24 acts against the roller track to accommodate the radial loads on and between the cylindrical hub members. The radial thrust roller 24 is attached to the cylindrical hub D by means of adjustable roller support struts 29 and 29a attached at one end to radial thrust roller axis 24a and at pivots 30 and 30a at the opposite ends to the hub D. The adjustable support struts react the radial loads of the radial thrust roller much like conventional shock absorbers.

Stiffened shear panel 31 with rectangular cutout 32 is attached to the framework of cylindrical hub D by any suitable means, such as welding and accommodates the radial thrust roller 24. Yoke panel 27 carries roller shaft 24a and is attached to panel 31 by means of hinge 27a. The shear panel 31 also constitutes part of the brush support structure to be hereinafter described. The shear panel provides a mounting base for a roller support beam 34 to which roller shafts 26a and 28a are attached which rotatably carry rollers 26 and 28. Preferably the roller track 20 has a hollow square cross section and is fabricated from aluminum or other suitable metal as may be panel 31. A number of the roller bearing assemblies are spaced about the circumference of cylinder hub D as required for stability.

The connecting means E which connects the cylindrical hubs C and D with their respective outer frame structures A and B includes six pairs of support tensioned cables. As illustrated, cable pairs 38 are connected between cylindrical hub D and the periphery of the interface framework of structure B. Each cable pair 38 is attached at two points 40 and 41 at the hub D and extends radially outward to a single point of attachment 42 at the framework of structure B. The same is true for the remaining pairs of cables 38 which terminate and connect at the points of a hexagon. The interface framework of structure B includes conventional truss frames and diagonals as required for stiffening to form a hexagonal cross section frame 43. The attachment points 42 correspond to the structural node points of the hexagonal frame. The remaining framework of structure B may be completed in a conventional manner as is required to support microwave antenna structure 12. Additional tensioned cable pairs may be arranged similarly at the opposing end of cylindrical hub D extending radially outward and connected to the framework of support structures B as required.

Cable pairs 44 are likewise connected and extend radially from the hub C out to the points of the hexagon 45 which form the interface framework for the structure A. The cable pairs 44 are connected at inner points 45a and 46 and at an outer point 48 which is the structural node of the hexagonal frame 45 of structure A. The remaining framework of structure A is completed in a conventional manner as is required to connect and support solar panels 10.

Radial loads between the solar panel support structure A and the microwave antenna support structure B are transmitted through the cable assemblies 44 and 38b to the respective cylindrical hubs and to the rotary bearing assembly F. The separation between the attachment of adjacent cable assemblies is greater at the outer attachment points 42b and 48 than at the inner attachment points. This provides longitudinal and dimensional stability to the ring and brush assemblies and supported hub members and probably precludes the necessity for additional cross bracing of the interface frame structure in the plane passing through the axis X of rotation.

The roller drive assembly G is illustrated as including a triangular drive ring 50 carried by drive ring support truss 50a which is carried by framework 52 attached to the hexagonal framework 43 of antenna support structure B. Framework 52 may include suitable truss frames 52a and diagonals 52b as required for supporting drive ring 50 and imparting rotation to frame structure B. Drive rollers 54, 56, and 58 engage the three surfaces of the triangular drive ring 50. Roller 58 is rotatably driven by any suitable means such as an electric motor drive 62. However, due to the low power delivery requirements of the drive roller, drive motor 62 may also be incorporated within the structure of the drive wheel. Electric motor 62 may be controlled by remote control in any suitable, conventional manner. As the roller 58 is driven, the drive ring 50 is rotated causing the structure B to rotate relative to the solar panel support panel structure A. In this manner, the microwave antenna 12 may be oriented in a desired direction. The rollers 54, 56, and 58 are carried by suitable means illustrated and attached to supportive framework 64 which, in turn, is attached by 64a to the hexagonal interface framework 45 of structure A.

While a preferred embodiment of the invention has been described using specific terms, such description is for illustrative purposes only, and it is to be understood that changes and variations may be made without departing from the spirit or scope of the following claims.

What is claimed is:

1. A structural array and electrical rotary joint apparatus for use in space structures and the like for transmitting power between large structures having relative rotational movement between each other comprising:

a first large structure having a supportive framework;

a second large structure having a supportive framework;

said first and second large structures being arranged for rotational movement relative to one another coaxially about a common axis of rotation;

a rotary interface defined at a rotary joint between said first and second structures;

a first cylindrical hub member carried centrally by said first structure;

a second cylindrical hub member carried centrally by said second structure;

connecting means connecting said first and second cylindrical hub members with said respective first and second structures in a generally rigid unitary manner whereby said relative rotational movement is transmitted from said first and second structures to said first and second cylindrical members, respectively;

said first and second cylindrical hub members being carried in a concentric relation with respect to one another;

first electrical conductor means carried by said first cylindrical hub member;

second electrical conductor means carried by said second cylindrical hub member, said first and second conductor means being carried in relative sliding contact for transmission of electrical power therebetween during said relative rotational movement;

a bearing support assembly rotatably connected between said first and second cylindrical members for connecting said cylindrical members and respective first and second structures during rotation and accommodating radial and axial loads on and between said cylindrical members;

said bearing assembly including a roller track carried by said first cylindrical member, a radial thrust roller rotatably carried by said second cylindrical member bearing against the outer cylindrical surface of said roller track acting against said radial loads, and a pair of axial thrust rollers rotatably carried by said second cylindrical member engaging sides of said roller track accommodating said axial loads; and drive means connected between framework of said first and second structures at an outer periphery of said rotary interface joint for rotating one of said structures relative to the other producing said relative rotational movement said drive means including means for interconnecting said first and second structures together as an integral structure as well as rotating said one structure.

2. The apparatus of claim 1 including adjustable supports carrying said radial support roller connected to said second cylindrical member, said adjustable supports adjusting to accommodate said radial loads on said radial support roller.

3. The apparatus of claim 1 wherein said bearing assembly includes a stiffened shear resisting panel carried by said second cylindrical member having a cut-out opening to accommodate said radial support roller, and a support beam carried by said panel supporting said axial support rollers.

4. The apparatus of claim 1 wherein said drive means includes a rotary drive ring carried by framework of said second structure and drive rollers carried by said first structure engaging said drive ring in a drive relation, and at least one of said drive rollers being rotatably driven to rotate said drive ring and hence said second structure relative to said first structure.

5. The apparatus of claim 1 wherein said connecting means includes tension cables extending radially and connected between said cylindrical hub members and circumferentially spaced points on the periphery of said first and second framework structures adjacent said rotary interface.

6. The apparatus of claim 5 wherein said first and second structures include hexagonal frame structures at said rotary interface, said tensioned cables being connected at apex structural node portions of said hexagonal frame structures to provide said circumferentially spaced connections affording balanced structural loading of said structures.

7. A space structure for transmitting power in space which comprises:
 a first space frame structure which carries a plurality of solar panels, having a first rotary hexagonal frame interface;
 a second space frame structure which carries associated power equipment having a second rotary hexagonal frame interface;
 said first and second rotary hexagonal frame interfaces providing a rotary joint between said first and second frame structures about which said structures rotate relative to one another about a common axis of rotation;
 a first rotary hub member carried by said first structure at said rotary interface;
 a second rotary hub member carried by said second frame structure at said rotary interface;
 said first and second rotary hub members being concentric with one another with said first and second frame structures joined together at said rotary interfaces;
 tension connecting means connecting said rotary hub members to said associated space frame structures such that each rotary hub member is connected to its associated space frame structure in a generally rigid unitary manner so that said rotary hub members move as a unit with the space frame structure to which it is connected;
 said tension members being connected between said rotary hub members and structural node points of said hexagonal frame interface of each space frame structure;
 an electrical rotary joint including a first electrical conductive surface carried by one of said rotary hub members and a second electrical conductive surface carried by the other of said rotary hub members, said conductive surfaces being in slidable electrical contact with one another for transferring electrical power from said solar panels carried on said first space frame structure to said associated power equipment carried on said second space frame structure;
 a bearing support assembly connected between said first and second rotary hub members for accommodating radial and axial loads exerted on and between said rotary hub members due to the rotation of said first and second frame structures, said bearing support assembly including a circular track carried about the periphery of one of said rotary hub members and a plurality of wheel assemblies carried by the other of said rotary hub members, said wheel assemblies including a pair of rollers engaging vertical surfaces of said track and at least one roller engaging a horizontal surface of said track affording resistance against axial and radial forces acting on said rotary hub members; and
 a roller drive assembly connected between said first and second frame structures at an outer periphery of said rotary hexagonal frame interfaces for rotating one of said space frame structures relative to the other, said drive assembly including a track member carried by one of said space frame structures at said outer periphery having converging sides converging towards said frame structure and a drive surface bridging said converging sides at divergent ends thereof, a pair of interconnecting rollers engaging said converging sides to interconnect said space frame structure, and a driven roller in engagement with said drive surface to drive said driven space frame structure relative to said other space frame structure.

* * * * *